April 3, 1951  J. R. GOSSER  2,547,313
AUTOMATIC TRAILER COUPLING

Filed Dec. 7, 1948  3 Sheets-Sheet 2

INVENTOR.
J. R. Gosser
BY
*lorhstr rwrhstr*
ATTYS

April 3, 1951  J. R. GOSSER  2,547,313
AUTOMATIC TRAILER COUPLING
Filed Dec. 7, 1948  3 Sheets-Sheet 3

INVENTOR.
J. R. Gosser
BY
ATTYS

Patented Apr. 3, 1951

2,547,313

UNITED STATES PATENT OFFICE 2,547,313

AUTOMATIC TRAILER COUPLING

John R. Gosser, Holt, Calif.

Application December 7, 1948, Serial No. 63,911

4 Claims. (Cl. 280—33.15)

This invention is directed to, and it is an object to provide, a novel coupling for use between a truck and trailer, or other similar heavy-duty vehicle.

Another object of the invention is to provide a trailer coupling, as above, which is designed so that it functions automatically upon relative thrusting of the trailer draft eye into said coupling; there being a retention hook in the coupling which is positively engaged, from below, through said draft eye.

A further object of the invention is to provide a trailer coupling, as in the preceding paragraph, which includes a novel mechanism arranged to automatically latch the hook in its engaged or operative position; such latching mechanism being manually releasable.

An additional object of the invention is to provide a trailer coupling, of the type described, which embodies a manually controlled safety lock unit which acts to releasably secure the hook latching mechanism against accidental release.

The invention also contemplates, as a separate object, the inclusion of a novel compression spring assembly arranged to maintain the trailer draft eye against loose play in the retention hook when the coupling is in use.

It is also an object of the invention to provide a trailer coupling which is quick-acting and positive; the coupling of trucks to trailers being greatly facilitated by use of the coupling.

A still further object of the invention is to provide a heavy-duty trailer coupling which is designed for ease and economy of manufacture.

A further object of the invention is to provide a reliable trailer coupling, and one which will be exceedingly effective for the purpose for which it is designed.

These objects are accomplished by means of such structure and relative arrangement of parts as will fully appear by a perusal of the following specification and claims.

Figure 1:
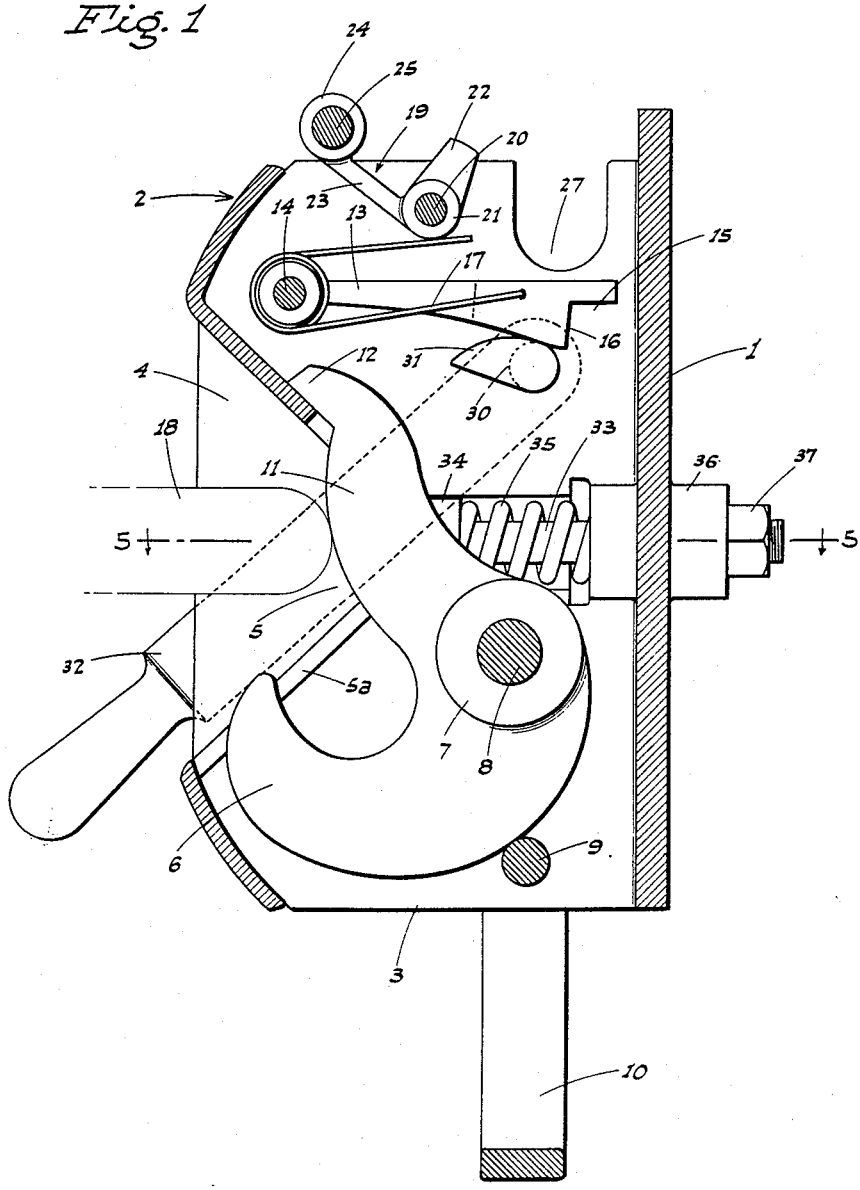
Fig. 1 is a sectional elevation of the coupling in position to receive, but before engagement of the trailer draft eye therein.

Referring now more particularly to the characters of reference on the drawings, the novel automatic trailer coupling is of heavy-duty construction throughout and includes a vertical mounting plate 1 adapted to secure to the rear end of a truck.

A housing 2 projects rearwardly from the mounting plate 1, and said housing includes transversely spaced side plates 3.

At the rear thereof the housing 2 is formed with an enlarged, inwardly tapering mouth 4 which is flat-sided but of generally funnel shape; such mouth leading inwardly to a throat 5 and the lower wall of the mouth being centrally slotted from the throat rearwardly, as at 5a.

Figure 2:
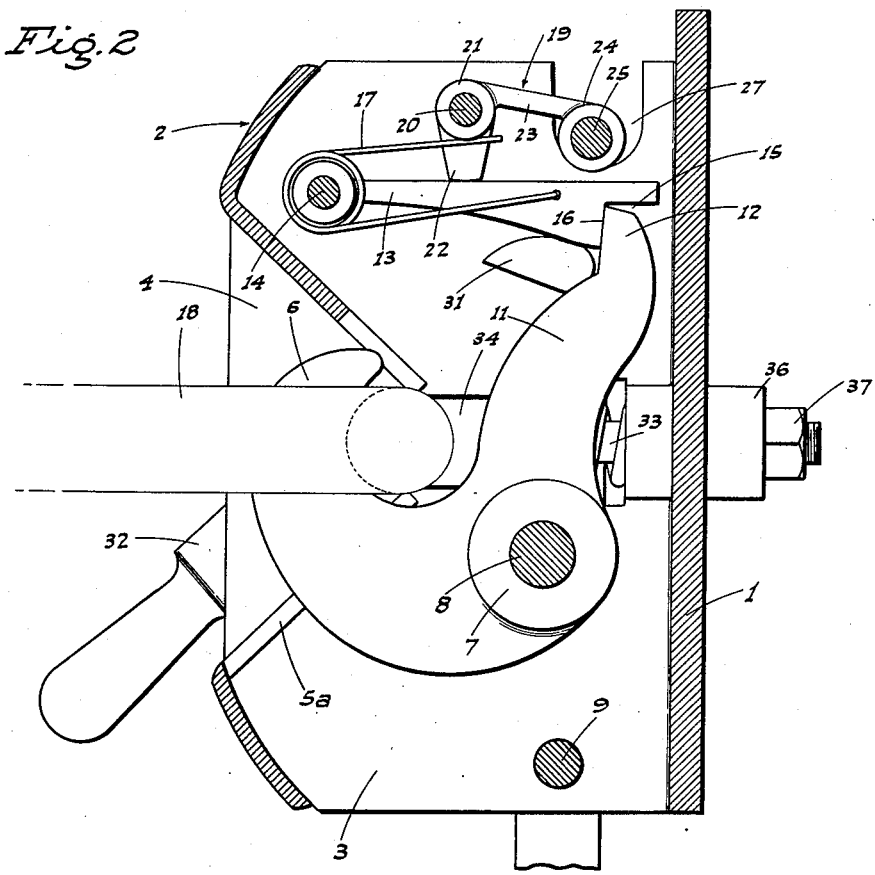
Fig. 2 is a similar view but shows the trailer draft eye as engaged by the coupling; the safety lock unit being in operative position.
Figure 3:
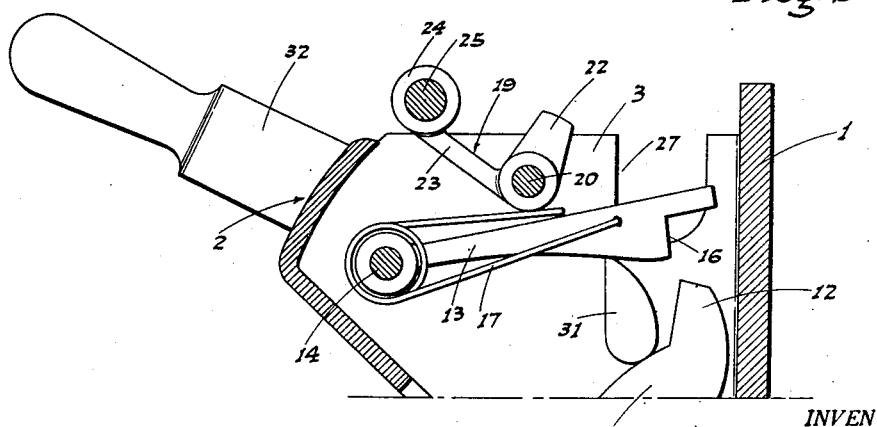
Fig. 3 is a fragmentary sectional elevation showing the safety lock unit, and the latch bar, in released positions.

A rearwardly facing, upwardly opening retention hook 6 is mounted in the housing 2 for movement between a lowered position, as in Fig. 1, to a raised position as in Fig. 2; the hook upon raising swinging upwardly through the slot 5a. The mount for the hook 6 comprises an integral hub 7 journaled on a cross shaft 8 which extends between the lower portion of the side plates 3.

In its inoperative lowered position the hook 6 is substantially free of, and does not materially project into, the mouth 4 through the slot 5a; said hook then resting downward against a cross bolt 9 which extends between the side plates at the bottom. This cross bolt 9 also serves as the securing means for a depending yoke 10, which yoke is for attachment of the safety chain (not shown) of the coupling.

Above the hub 7 the hook 6 includes an upstanding shank 11 which forms, in effect, a trigger. The upper end of said shank comprises a forwardly facing stop 12 which rests against the back side of the mouth 4 above the upper end of the throat 5.

Above and alined with the shank 11 the coupling includes a longitudinal latch bar 13 pivoted at its rear end in connection with a cross bolt 14 which extends between the side plates 3; such latch bar 13 thus being mounted for vertical swinging motion.

At its front end the latch bar 13 is notched, as at 15, to form a shoulder 16 which faces the mounting plate 1, and said latch bar 13 is yieldably urged in a downward direction by a leaf spring 17 secured to said latch bar and thence looping about the cross bolt 14 and being anchored, as shown.

To engage the coupling the truck is backed toward the trailer until the vertical axis, trailer draft eye 18 thrusts into the mouth 4; perfect alinement being unnecessary for the reason that the taper of such mouth properly directs the eye 18 inwardly.

As the trailer draft eye 18 thrusts through the slot 5 it engages the trigger shank 11, pushing it rearwardly, which causes the hook 7 to swing upward from its position, as shown in Fig. 1, and to engage through said eye 18 from below, as shown in Fig. 2. With such engagement the stop 12 has shifted toward the mounting plate 1, engaging and swinging the latch bar 13 upwardly until said stop 12 snaps into engagement with the shoulder 16. This effectively latches the hook 6 in engagement with the eye 18. The throat 5 is of limited height so that the eye 18 cannot escape upwardly off the hook 6 when the coupling is engaged.

In order to prevent the latch bar 13 from accidentally escaping the trigger shank 11 when the coupling is engaged, such latch bar 13 is held or locked down by the following safety lock unit, which unit is indicated at 19.

The safety lock unit 19 comprises a cross bolt 20 which extends between the upper portion of the side plates 3 above the latch bar 13, and a bearing sleeve 21 surrounds such cross bolt; there being a locking dog 22 radiating from said sleeve 21. The locking dog 22 is in an upstanding position, as in Fig. 1, when the coupling is released, but when the coupling is engaged the bearing sleeve 21 is turned sufficient to swing the locking dog 22 downwardly into holding engagement with the top of the latch bar 13 in the manner shown in Fig. 2. Such swinging of the bearing sleeve 21 and locking dog 22 is accomplished by means of arm 23 which projects from the bearing sleeve 21 in a rearward and upward direction when the safety lock unit 19 is in its released position.

Figure 4:
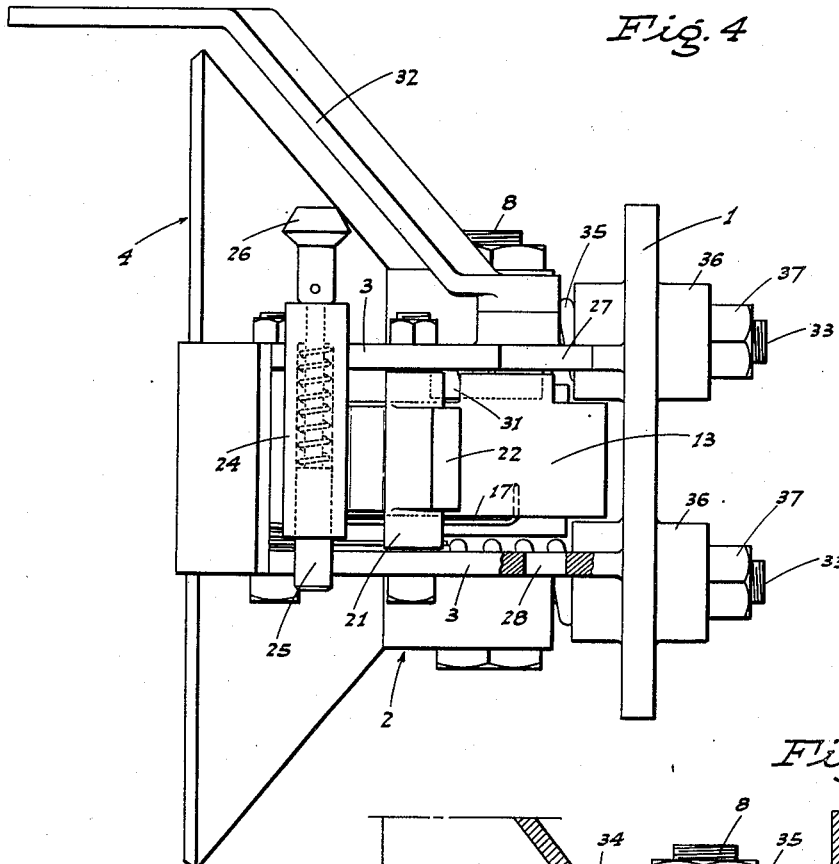
Fig. 4 is a top plan view of the coupling with the parts as in Fig. 1.
Figure 5:
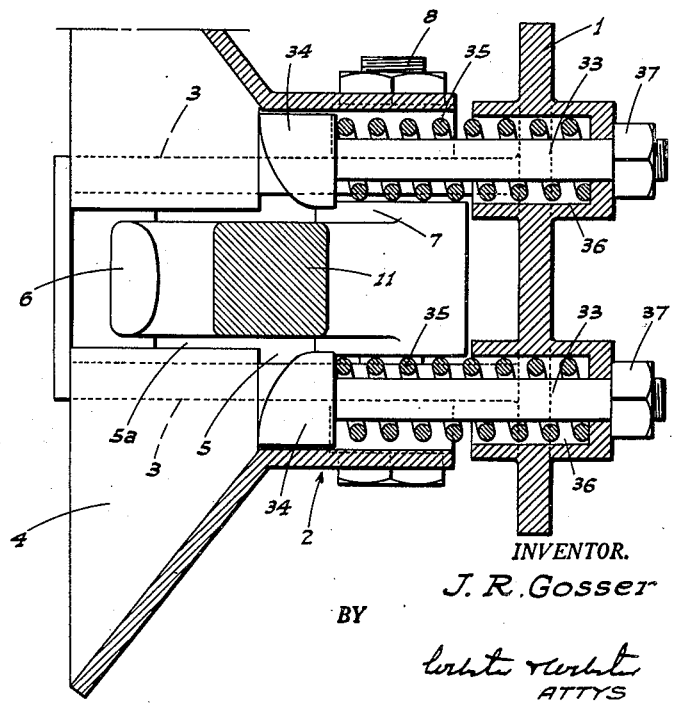
Fig. 5 is a sectional plan on line 5—5 of Fig. 1.

At its inner end the arm 23 is fitted with a transverse sleeve 24 which carries a spring pressed locking pin 25 which includes a knob 26 at one end. At the other end the pin 25 projects somewhat, as shown in Fig. 4. To place the safety lock unit 19 in operation the pin carrying sleeve 24 is swung toward the mounting plate 1, until one end of such sleeve engages in a notch 27 in one side plate, at which time the spring pressed locking pin 25 is manually retracted, and then permitted to engage in a receiving bore 28 in the other side plate. This secures the safety lock unit 19 in its operative position, with the locking dog 22 bearing atop the latch bar 13; thereby positively and effectively preventing any actual disengagement of the coupling.

When it is desired to disengage the coupling the above described safety lock unit 19 is released, by pulling the spring-pressed locking pin 25 free of the bore 28 and then swinging said safety lock unit to the position shown in Fig. 1. Thereafter the following mechanism is employed to mechanically and forcefully lift the latch bar 13 free of the upstanding trigger shank 11:

A stub shaft 30 is journaled in one side plate 3 and inwardly of said side plate carries a cam 31 which works against the under side of the latch bar 13 laterally of the upstanding trigger shank 11. Exteriorly of the housing 2 the stub shaft 30 is fitted with a hand lever 32. By swinging the hand lever 32 upwardly from a normally lowered position, the cam 31 swings upwardly, carrying the latch bar 13 with it, and releasing said bar from the upstanding trigger shank 11. When this occurs the hook 6 falls free of the trailer draft eye 18, which disengages the coupling and permits the truck and trailer to be separated.

When the coupling is engaged, with the hook 6 projecting through the trailer draft eye from below, loose play between said parts, in a longitudinal direction, is effectively prevented by means of the following compression spring assembly:

A pair of longitudinal plunger rods 33 project rearwardly in transversely spaced relation on opposite sides of the upstanding trigger shank 11; such plunger rods being formed, at the ends adjacent said shank 11, with pads 34 having faces which are rounded in a forwardly converging direction. Heavy-duty compression springs 35 surround the plunger rods 33 between the pads 34 and sockets 36 formed in the mounting plate 1, and in which sockets said springs are guidingly received at one end portion. The compression springs 35 are normally part loaded, and movement of the pads 34 and rods 33 by said springs is limited by end nuts 37 on such rods exteriorly of the sockets 36.

When the trailer draft eye 18 is thrust through the throat 5 said eye abuts the pads 34 and forces the same inwardly against the compression of springs 35 before the retention hook 6 swings upwardly to its full holding position. As a consequence, the pads 34 constantly urge the trailer draft eye 18 in a rearward direction during the time that the coupling is engaged. This assures of bearing of the trailer draft eye 18 against the outer portion of the hook under normal draft conditions, preventing any undesirable loose play in the coupling.

The described coupling, by reason of its automatic engagement with the trailer draft eye 18, can be brought into play quickly and effectively, with a minimum of jockeying on the part of the truck driver, and without the necessity of manual attention to said coupling.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. A coupling for engagement with a vertical axis draft eye, comprising a support, a hook pivoted on the support for vertical swinging motion through the eye upon longitudinal movement of the latter toward the support and to a predetermined position, means operative to releasably latch the hook in eye engagement, plunger rods extending on opposite sides of the hook alined with the eye when in said predetermined position, pads on adjacent ends of the rods then engaging the eye on opposite sides of the hook, and loaded heavy duty springs urging the rods and pads toward the eye.

2. In a coupling for engagement with a vertical-axis draft eye, a support having an outwardly opening throat to receive the forward end of the eye, an upwardly opening hook initially disposed in a lowered position and transversely pivoted in the support in front of and below the throat for upward swinging movement through the eye when the latter is in the throat and a rearwardly opening mouth in the support having upper and lower walls the lower one of which flares rearwardly from the throat; the lower wall substantially covering the hook when the latter is in said lowered position and being slotted lengthwise for the passage of the hook when the latter is swung upwardly.

3. A structure as in claim 2, with a shank on the hook extending upwardly across the throat when the hook is in said position and terminating at its upper end in a stop then overhanging and engaging the upper wall of the mouth.

4. A coupling for engagement with a vertical axis draft eye, comprising a support, an initially lowered, upwardly opening hook, means transversely pivoting the hook on the support for upward swinging motion through the eye when the latter is in a predetermined position relative to said support, an upstanding trigger shank on the hook, movement of the eye to said predetermined position causing the eye to engage and move the trigger shank in a direction and to a certain position to swing the hook upward through the eye, a longitudinal latch bar transversely pivoted on the support above the trigger shank to engage and latch the trigger shank when the latter is in said certain position, hand means to raise the latch bar clear of the shank; the support including spaced side walls between which the latch bar is disposed, and a safety lock unit above said bar and comprising a locking dog pivoted on said walls above the bar and adapted when depending to bear on top of said bar and prevent raising thereof, an arm rigid with the dog and projecting radially and upwardly from the pivot, a transverse sleeve on the upper end of the arm overhanging one side wall and resting thereon when the unit is swung in one direction to dispose the dog in an inoperative position, and a transversely shiftable spring-pressed locking pin in the sleeve, the other wall having an opening to receive the pin when the unit is swung on its pivot in the opposite direction to dispose the dog in a depending bar engaging position.

JOHN R. GOSSER.

REFERENCES CITED

The following references are of record in the file of this patent:

UNITED STATES PATENTS

| Number | Name | Date |
|---|---|---|
| 1,408,501 | Clement | Mar. 7, 1922 |
| 1,437,836 | Ferris | Dec. 5, 1922 |
| 1,448,950 | Uecker | Mar. 20, 1923 |
| 1,588,942 | Clark | June 15, 1926 |
| 1,939,463 | Rockinger | Dec. 12, 1933 |
| 2,183,990 | Dunn | Dec. 19, 1939 |
| 2,217,148 | Weiss | Oct. 8, 1940 |
| 2,269,806 | Brecka | Jan. 13, 1942 |